(No Model.)
H. A. OTTO.
WASHER.
No. 551,043. Patented Dec. 10, 1895.
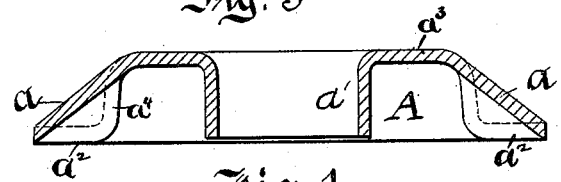
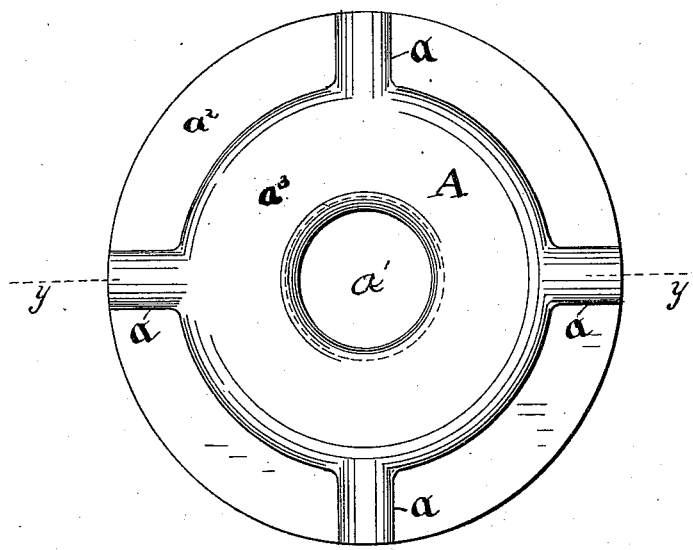
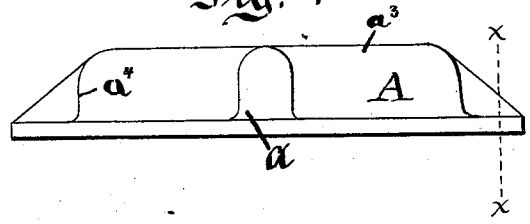
Witnesses
L. deB. Little
Thos. H. Shelady.
Inventor
Henry A. Otto
by J. H. Stevenson
Attorney

UNITED STATES PATENT OFFICE.

HENRY A. OTTO, OF ALLEGHENY, PENNSYLVANIA.

WASHER.

SPECIFICATION forming part of Letters Patent No. 551,043, dated December 10, 1895.

Application filed February 20, 1895. Serial No. 539,104. (No model.)

*To all whom it may concern:*

Be it known that I, HENRY A. OTTO, a citizen of the United States, residing at Allegheny, in the county of Allegheny and State of Pennsylvania, have invented certain new and useful Improvements in Washers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a spring-washer for bolts and for use in bridge or other structures.

In the accompanying drawings, Figure 1 is a top view of the washer. Fig. 2 is a vertical section on the line $x$ $x$ of Fig. 4. Fig. 3 is a vertical section on the line $y$ $y$ of Fig. 1, and Fig. 4 is a side elevation.

Similar letters of reference indicate similar parts in the several figures.

A represents the washer, which is formed by suitable dies from a single piece of sheet metal, preferably spring-steel. The spring-washer thus formed has a base portion $a^2$ and a central cylindrical portion $a'$ at substantially a right angle to the base $a^2$. These two portions are connected by the walls $a^3$ and $a^4$, the former being substantially parallel to the base $a^2$ and the latter to the central cylindrical portion $a'$. At suitable intervals the metal in the base $a^2$ and wall $a^4$ is struck up to form strengthening-ridges $a$. The cylindrical portion $a'$ is designed for the passage of the bolt, and the base of the washer extends beyond the plane of the inner end of said cylindrical portion. The wall $a^3$ forms a bearing for the bolt-head or the nut. It will therefore be evident that when the washer and bolt are in position a space will be left between the inner end of the cylindrical portion $a'$ and the surface against which the base of the washer bears. When the nut is screwed up on the bolt, the cylindrical portion $a'$ will be forced inwardly and the resiliency of the washer will tend to jam the nut on the bolt and lock it thereon.

Having described my invention, I claim—

A spring washer, having a central cylindrical portion, a base portion extending beyond the plane of the inner end of the cylindrical portion and arranged at substantially a right angle thereto, walls connecting the base and cylindrical portions, one of said walls being substantially parallel to the base and the other to the cylindrical portion, and strengthening ridges struck up from the metal of the base and the wall parallel to the cylindrical portion, as and for the purpose specified.

In testimony whereof I affix my signature in presence of two witnesses.

HENRY A. OTTO.

Witnesses:
S. D. KARNS,
R. A. THOMPSON.